United States Patent
Goldstein et al.

(10) Patent No.: US 9,460,052 B2
(45) Date of Patent: Oct. 4, 2016

(54) SIGNAL RECONSTRUCTION USING TOTAL-VARIATION PRIMAL-DUAL HYBRID GRADIENT (TV-PDHG) ALGORITHM

(71) Applicant: InView Technology Corporation, Austin, TX (US)

(72) Inventors: Thomas A. Goldstein, Houston, TX (US); Matthew A. Herman, Austin, TX (US)

(73) Assignee: InView Technology Corporation, Austin, TX (US)

( * ) Notice: Subject to any disclaimer, the term of this patent is extended or adjusted under 35 U.S.C. 154(b) by 367 days.

(21) Appl. No.: 14/137,206

(22) Filed: Dec. 20, 2013

(65) Prior Publication Data
US 2014/0297703 A1    Oct. 2, 2014

Related U.S. Application Data

(60) Provisional application No. 61/745,017, filed on Dec. 21, 2012.

(51) Int. Cl.
G06F 17/10 (2006.01)
G06T 9/00 (2006.01)
H04N 19/90 (2014.01)

(52) U.S. Cl.
CPC ............... *G06F 17/10* (2013.01); *G06T 9/00* (2013.01); *H04N 19/90* (2014.11)

(58) Field of Classification Search
CPC ....... G06F 17/10; G06F 17/11; G06F 17/145
See application file for complete search history.

(56) References Cited

U.S. PATENT DOCUMENTS

| 4,129,887 A *   | 12/1978 | Michon ............. H04N 5/33 250/214.1 |
| 8,570,405 B2    | 10/2013 | Kelly et al. |
| 2003/0120691 A1* | 6/2003  | Nakayama ............ G06F 17/145 708/400 |
| 2006/0029279 A1* | 2/2006  | Donoho ............. G06K 9/0057 382/232 |

OTHER PUBLICATIONS

Wen et al., "Parameter Selection for Total-Variation-Based Image Restoration Using Discrepancy Principle", IEEE, Apr. 2012, pp. 1770-1781.*
Zhu, Mingqiang; and Tony Chan; "An Efficient Primal-Dual Hybrid Gradient Algorithm for Total Variation Image Restoration"; Apr. 2008; pp. 1-29.

* cited by examiner

*Primary Examiner* — Chuong D Ngo
(74) *Attorney, Agent, or Firm* — Meyertons Hood Kivlin Kowert & Goetzel, P.C.; Jeffrey C. Hood; Mark K. Brightwell (57) ABSTRACT

A mechanism for reconstructing a signal (e.g., an image) based on a vector s, which includes measurements of the signal. The measurements have been acquired using at least a portion of a measurement vector set represented by a matrix H. Each of the measurements corresponds to a respective row of the matrix H. (For example, each of the measurements may correspond to an inner product between the signal and a respective row of the matrix product HD, wherein D is a generalized permutation matrix.) A total-variation primal-dual hybrid gradient (TV-PDHG) algorithm is executed based on data including the matrix H and the vector s, to determine an estimate for the signal. The TV-PDHG algorithm is implemented in fixed-point arithmetic.

33 Claims, 3 Drawing Sheets

---

A method for reconstructing a signal based on a vector s subject to a constraint that a subset of the pixels in the image are equal to zero, where the vector s is a vector of measurements of the image, where the measurements have been acquired using at least a portion of a measurement vector set represented by the matrix H *300* execute a total-variation primal-dual hybrid gradient (PDHG) algorithm to determine a solution of the problem given by:

$$\max_{q,;p;\leq C} \min_u \left\{ p \cdot \nabla u + q \cdot Zu + \frac{\mu}{2} \|RHDu - s\|^2 \right\}$$

wherein the minimization is over a space of images corresponding to the vector variable u, where p and q are vector variables, wherein C is a positive constant, wherein R is a diagonal matrix whose diagonal elements are selected from the set {0,1}, wherein R is not equal to the zero matrix, wherein D is a generalized permutation matrix, wherein μ is a non-negative scalar value, wherein the solution represents an estimate of the image *310* display the solution using a display device *315*

A method for reconstructing a signal based on a vector s subject to a constraint that a subset of the pixels in the image are equal to zero, where the vector s is a vector of measurements of the image, where the measurements have been acquired using at least a portion of a measurement vector set represented by the matrix H *300* execute a total-variation primal-dual hybrid gradient (PDHG) algorithm to determine a solution of the problem given by:

$$\max_{q, |p| \leq C} \min_u \left\{ p \cdot \nabla u + q \cdot Zu + \frac{\mu}{2} \|RHDu - s\|^2 \right\}$$

wherein the minimization is over a space of images corresponding to the vector variable u, where p and q are vector variables, wherein C is a positive constant, wherein R is a diagonal matrix whose diagonal elements are selected from the set {0,1}, wherein R is not equal to the zero matrix, wherein D is a generalized permutation matrix, wherein μ is a non-negative scalar value, wherein the solution represents an estimate of the image *310* display the solution using a display device *315*

FIG. 3

SIGNAL RECONSTRUCTION USING TOTAL-VARIATION PRIMAL-DUAL HYBRID GRADIENT (TV-PDHG) ALGORITHM

PRIORITY CLAIM

This application claims the benefit of priority to U.S. Provisional Application No. 61/745,017, filed on Dec. 21, 2012, invented by Thomas A. Goldstein and Matthew A. Herman, which is hereby incorporated by reference in its entirety as though fully and completely set forth herein.

FIELD OF THE INVENTION

The present invention relates to the field of compressive sensing, and more particularly, to mechanisms for reconstructing a signal (e.g., an image) from compressively-acquired measurements of the signal.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_s=1/T_s$ at which the samples are captured is sufficiently high, i.e., provided that $f_s$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx,mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, . . . , M} in the N-dimensional space, where M is larger than K but still much smaller than N. Each projection gives a corresponding real number S(i), e.g., according to the expression $$S(i)=<v,R(i)>,$$

where the notation <v,R(i)> represents the inner product (or dot product) of the vector v and the vector R(i). Thus, the series of M projections gives a vector U including M real numbers: $U_i=S(i)$. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244, issued Jun. 12, 2012 (invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

Figure 1:
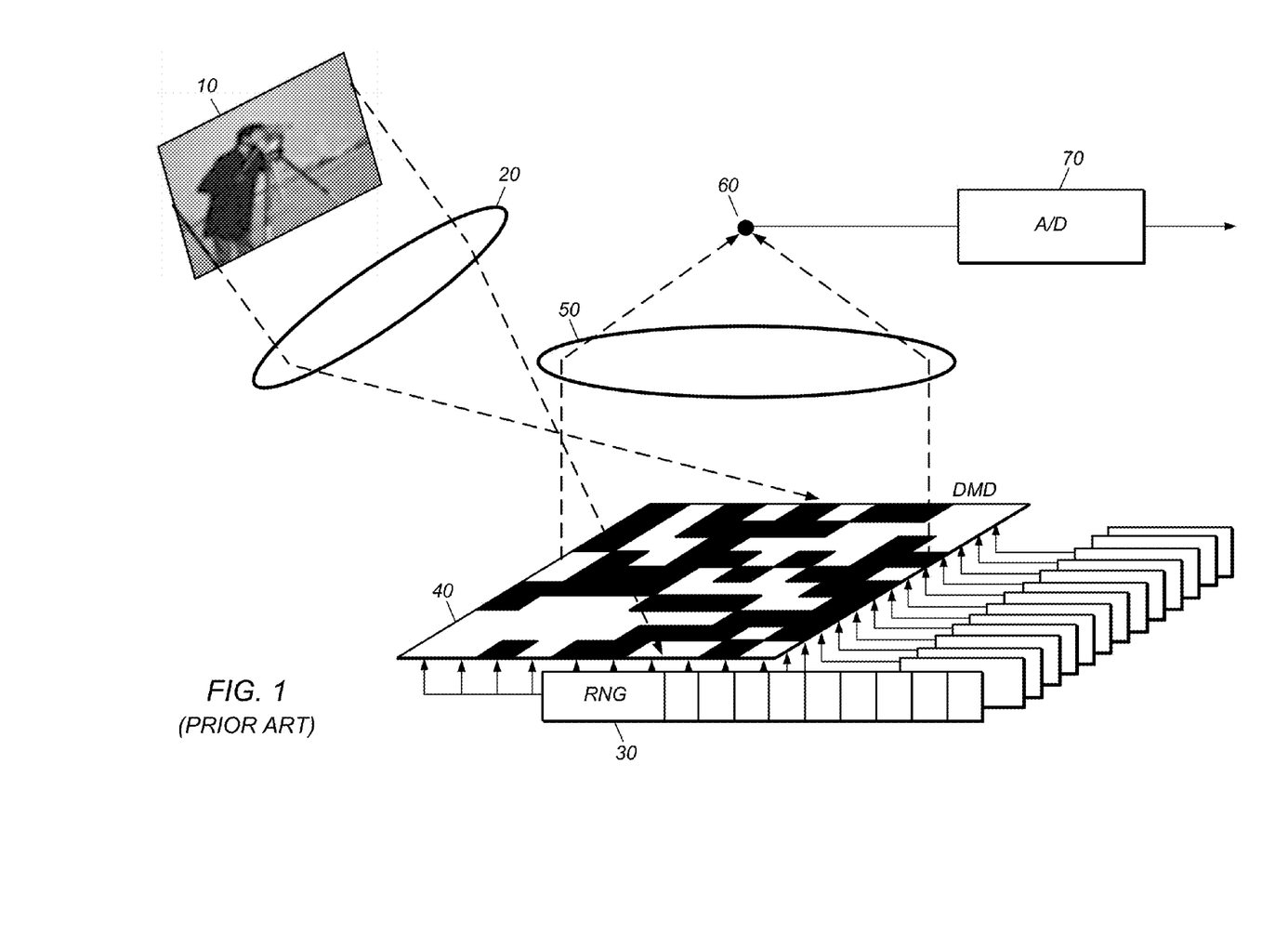
FIG. 1 illustrates a compressive sensing camera according to the prior art.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {S(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by {I(nΔx,mΔy,t)*M(n,m,t)} where m and n are integer indices, where I(nΔx,mΔy,t) represents the portion of the light field that is incident upon that $(n,m)^{th}$ minor of the DMD at time t. The function M(n,m,t) represents the orientation of the $(n,m)^{th}$ minor of the DMD at time t. At sampling times, the function M(n,m,t) equals one or zero, depending on the state of the digital control signal that controls the $(n,m)^{th}$ minor. The condition M(n,m,t)=1 corresponds to the orientation state that reflects onto the path that leads to the lens 50. The condition M(n,m,t)=0 corresponds to the orientation state that reflects away from the lens 50.

The lens 50 concentrates the spatially-modulated light field

{I(nΔx,mΔy,t)*M(n,m,t)} onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t)M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the minors. The multiplication portion of the inner product is implemented by the minors of the DMD. The summation portion of the inner product is implemented by the concentrating action of the lens and also the integrating action of the photodiode.

The measurements of the signal S(t) may be used to reconstruct an estimate of the image that was carried in the incident light stream, i.e., the input light stream to the imaging device (e.g., camera). There exists a variety of computational methods for performing the image reconstruction. However, those methods tend to be computationally intensive and produce varying levels of image reconstruction quality. Any improvements in computational efficiency and/or image reconstruction quality are greatly to be desired.

SUMMARY

In one set of embodiments, a method for reconstructing a signal may be performed as follows. The signal may be reconstructed based on on a vector s, wherein the vector s includes measurements of the signal, wherein the measurements have been acquired using at least a portion of a measurement vector set represented by a matrix H, wherein each of the measurements corresponds to a respective row of the matrix H. The matrix H may be orthogonal or unitary.

The method may include executing a total-variation primal-dual hybrid gradient (TV-PDHG) algorithm based on data including the matrix H and the vector s, to determine an estimate for the signal, wherein said executing is performed by digital circuitry, wherein the total-variation primal-dual hybrid algorithm is implemented in fixed-point arithmetic.

The method may also include storing the signal estimate in a memory.

In another set of embodiments, a method for reconstructing a signal may be performed as follows. The signal may be reconstructed based on a vector s, subject to a constraint that a subset of the pixels in the image are equal to zero, wherein the vector s is a vector of measurements of the image, wherein the measurements have been acquired using at least a portion of a measurement vector set represented by the matrix H.

The method may include executing a total-variation primal-dual hybrid gradient (TV-PDHG) algorithm to determine a solution of the problem given by:

$$\max_{q,|p|\leq C} \min_u \left\{ p \cdot \nabla u + q \cdot Zu + \frac{\mu}{2} \|RHDu - s\|^2 \right\}$$

wherein the minimization is over a space of images corresponding to the vector variable u, where p and q are vector variables, wherein said executing is performed by digital circuitry, wherein C is a positive constant, wherein R is a diagonal matrix whose diagonal elements are selected from the set {0,1}, wherein R is not equal to the zero matrix, wherein D is a generalized permutation matrix, wherein μ is a non-negative scalar value, wherein the solution represents an estimate of the image. For example, in some embodiments, the matrix D is a diagonal matrix whose diagonal elements are ones and minus ones, and thus, $D^{-1}=D^T=D$.

The method may also include displaying the solution using a display device.

Various additional embodiments are described in U.S. Provisional Application No. 61/745,017, filed on Dec. 21, 2012.

BRIEF DESCRIPTION OF THE DRAWINGS

A better understanding of the present invention can be obtained when the following detailed description of the preferred embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network.

A computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

Mechanism for Reconstructing Signal

TV-PDHG (total-variation primal-dual hybrid gradients) is a scheme for solving problems of the form $$\min_x \{f(Ax) + g(x)\},$$

where x is a vector variable, where A is matrix, where f and g are predetermined functions. The scheme treats the terms f and g separately, which allows the individual structure of each term to be exploited.

In this section, we use TV-PDHG to address the problem of reconstructing a signal (e.g., image) that has been sampled by a measurement process (e.g., by a compressive measurement process as variously described above). The measurement process may be modeled by the expression s=RHDx, where x is a vector representing the original signal, and s is vector whose elements represent measurements of the original signal x. The matrix D may be a generalized permutation matrix. A generalized permutation matrix is a square matrix that has exactly one non-zero element in each column and in each row, where the non-zero elements are free to be any non-zero real number. In some embodiments, the matrix D is a diagonal matrix whose diagonal elements are drawn from the set {1,−1}. In other embodiments, the matrix D is a permutation matrix. In yet other embodiments, the matrix D is a signed permutation matrix. A signed permutation matrix is a square matrix with exactly one non-zero element in each column and each row, where the non-zero elements are drawn from the set {1,−1}.

The matrix H is a measurement matrix (e.g., an orthogonal Hadamard matrix, or a randomly-generated matrix). The matrix H may be identified with the above-described measurement vector set, where the rows of the matrix H correspond to the vectors of the measurement vector set. Alternatively, the matrix product HD may be identified with the above-described measurement vector set.

The matrix R is a diagonal row-selector matrix, whose diagonal elements are drawn from the set {0,1}. Thus, if a given element on the diagonal of R is equal to one, the corresponding element in the measurement vector s is generated using the corresponding row of the matrix H. Conversely, if a given element on the diagonal of R is equal to zero, the corresponding element in the measurement vector s is forced to zero, i.e., the corresponding row of the matrix H is not used.

For the problem of signal reconstruction, the sample vector s is supplied as input, and we reconstruct (i.e., compute an estimate) signal u. The reconstruction uses the following specialized form of the above-stated minimization:

$$\min_u \{|\nabla u| + \frac{\mu}{2}\|RHDu - s\|^2\}, \quad (1)$$

where $\nabla$ is the discrete gradient operator, where $\mu$ is a scalar value that controls the relative importance of the total variation term vs. the quadratic term. The minimization is over the vector variable u with dimension corresponding to the original signal or image x.

To solve the above problem using TV-PDHG, we first note that, for any real number z, we have $$|z| = \max_{-1 \leq p \leq 1} pz.$$

Using this principle, we can write equation (1) as $$\max_{|p| \leq 1} \min_u \{(p \cdot \nabla u) + \frac{\mu}{2}\|RHDu - s\|^2\}, \quad (2)$$

where p is a vector variable with the same number of elements as the vector u, where p*$\nabla$u denotes the dot product of p and $\nabla$u.

In some embodiments, we attack this problem by alternately minimizing with respect to u, and then maximizing with respect to p, e.g., as follows.

The expression $|\nabla u|$ (e.g., in Eq. (1)) has several interpretations depending on the dimensionality of the signal u. For example, if u is a 1-dimensional, length-N vector, then $|\nabla u|$ can be simply viewed as $$|\nabla u| = \sum_{i=1}^{N-1} |u_{i+1} - u_i|.$$

If u is a 2-dimensional signal, i.e., an N-pixel image, then two popular interpretations are the isotropic and anisotropic TV-norms. Assume that the difference operator acts on the signal u in its native 2-dimensional form with m rows and n columns, such that the total number of pixels N=m*n. Then we have $$|\nabla u|_{iso} = \sum_{i,j} \sqrt{|u_{i+1,j} - u_{i,j}|^2 + |u_{i,j+1} - u_{i,j}|^2}$$

$$|\nabla u|_{aniso} = \sum_{i,j} \{|u_{i+1,j} - u_{i,j}| + |u_{i,j+1} - u_{i,j}|\}$$

where the sum is taken over i=m−1 and j=n−1.

Similar ideas can be extended to signals of higher dimension. Moreover, if the multi-dimensional, N-element signal u has been reshaped to a 1-dimensional vector of length N, then the difference operator and indexing of the corresponding magnitudes need to be adjusted accordingly.

When constraining the magnitude of the dual variable p, i.e., $|p| \leq C$ (e.g., in Equation (2)) for some nonzero, real constant C, it is understood that it is to be taken componentwise. This is equivalent to re-projecting the vector p onto the infinity-norm ball of radius C. Similar to the magnitude of $\nabla u$, there are often several interpretations available. For example, if p is a 1-dimensional signal of length N, then $|p| \leq C$ simply means that $|p_i| \leq C$ for all i=1, . . . , N. If p is a 2-dimensional signal of length N, then $|p| \leq C$ can be interpreted isotropically as $$\sqrt{|p_{i,1}|^2 + |p_{i,2}|^2} \leq C$$

for each i=1, . . . , N, or anisotropically as $$|p_{i,1}| + |p_{i,2}| \leq C$$

for each i=1, . . . , N. Similar ideas can be extended to signals of higher dimension.

1. The TV-PDHG Steps 1.1 Gradient Descent for u. First, we (approximately) minimize the energy with respect to u. This may happen in two stages. Note that the energy (2) consists of two terms—a dot product and a norm. We first deal with the dot product term using gradient descent. Note that the gradient of this term with respect to u is $\nabla^T p$, which is also commonly written $\nabla^* p$. (Here "$\nabla^*$" denotes the divergence operator.) For this operator to be the transpose of the gradient, the gradient must use forward differences, and the divergence operator must use backward differences). The gradient descent step begins with the current approximation ($u_k$) and then takes a step of length $\tau$ in the gradient direction:

$$\hat{u} = u_k - \tau(\nabla \cdot p_k)$$

1.2. Proximal Step for u. To deal with the norm term in the energy (2), we use a 'proximal' step, i.e. we solve the following problem $$u_{k+1} = \min_u \{\frac{\mu}{2}\|RHDu - s\|^2 + \frac{1}{2\tau}\|u - \hat{u}\|^2\}.$$

This minimization is solved by taking the derivative of the energy we want to minimize, and setting it equal to zero. The derivative is $$\mu D^T H^T R^T (RHDu_{k+1} - s) + \frac{1}{\tau}(u_{k+1} - \hat{u}) = 0.$$

The solution to this equation can be written as $$u_{k+1} = \left(\mu D^T H^T R^T RHD + \frac{1}{\tau}I\right)^{-1} \left(\mu D^T H^T R^T s + \frac{1}{\tau}\hat{u}\right).$$

Recall that R is diagonal, and thus, $R^T = R$. If we also note that $R^2 = R$, we have $$u_{k+1} = \left(\mu D^T H^T RHD + \frac{1}{\tau}I\right)^{-1} \left(\mu D^T H^T Rs + \frac{1}{\tau}\hat{u}\right).$$

Note, if the non-zero elements of D are ones and minus ones, then we have $D^{-1}=D^T$. Furthermore, if H is unitary, then $H^{-1}=H^T$. Finally, we note that $I=D^TH^THD$, which allows us to write $$u_{k+1} = (D^TH^T(\mu R + \tau^{-1}I)HD)^{-1}\left(\mu D^TH^TRs + \frac{1}{\tau}\hat{u}\right).$$

The solution to this problem can be written explicitly as $$u_{k+1} = D^TH^T(\mu R + \tau^{-1}I)^{-1}HD\left(\mu DH^TRs + \frac{1}{\tau}\hat{u}\right).$$

If D is a diagonal matrix whose diagonal elements are ones and minus ones, then we have $D^T=D$.

1.3. Over-relaxation for u. Once we have computed $u_{k+1}$, we need to "over relax" the results by computing $$\bar{u}=u_{k+1}+(u_{k+1}-u_k).$$

This new vector will be needed an input to the next step of the method. The reason for using $\bar{u}$ rather than $u_{k+1}$ is that it makes the method more stable, and thus, we are able to choose much larger step size parameters, which accelerates the convergence of the algorithm.

1.4. Maximization for p. To handle p, we first do a gradient ascent step, i.e. we begin with $p_k$, and move up the gradient. We obtain $$\hat{p}=p_k+\sigma\nabla\bar{u}.$$

The next step is a proximal step, in which we solve $$p_{k+1} = \min_p\left\{1(p) + \frac{1}{2\sigma}\|p-\hat{p}\|^2\right\},$$

where 1(*) denotes the indicator function of the set $|p|\leq 1$.

The solution to this problem is a simple re-projection of the vector $\hat{p}$ into its constraint set. The form of this solution is $$p_{k+1}=\min\{\max(\hat{p},-1),1\}.$$

2. TV-PDHG with Virtual Pixels

In the case of 'virtual' pixels, we are embedding the reconstruction problem of length N into a larger problem whose size can be efficiently implemented. In order for this to work, we need to inactivate the extra added pixels by enforcing that they have value zero in the final reconstruction. In other words, we must add a constraint of the form $Zu=0$, where Z is a diagonal matrix of 0's and 1's that selects which entries in u must be zero. The optimization problem we need to solve is:

$$\min_u\left\{|\nabla u| + \frac{\mu}{2}\|RHDu-s\|^2\right\} \quad (3)$$

such that $Zu = 0$.

We can now reformulate the problem for TV-PDHG by adding in the dual variable p just like we did above. To handle the extra constraints, we add an extra Lagrange multiplier, q. The resulting formulation is $$\max_{q,|p|\leq 1}\min_u\left\{(p\cdot\nabla u) + q\cdot Zu + \frac{\mu}{2}\|RHDu-s\|^2\right\} \quad (4)$$

With these new modifications the algorithm may be expressed in the following Table.

TABLE

Algorithm 1 for TV-PDHG with Virtual Pixels

1:     for k = 0, 1, . . . do
2:     $\hat{u} = u_k - \tau(Zq + \nabla \cdot p)$
3:     $u_{k+1} = D^TH^T(\mu R + \tau^{-1}I)^{-1}HD\left(\mu D^TH^TRs + \frac{1}{\tau}\hat{u}\right)$
4:     $\bar{u} = u_{k+1} + (u_{k+1} - \hat{u})$
5:     $\hat{p} = p_k + \sigma_p\nabla\bar{u}$
6:     $p_{k+1} = \min\{\max(\hat{p}, -1), 1\}$
7:     $q_{k+1} = q + \sigma_q Z\bar{u}$
8:     end for Note that, because we do not have to enforce any constraints of the new dual variable q, the q update has no proximal step. Also, we now have separate timesteps for the p and q dual variables.

When implementing the above algorithm (Algorithm 1), the program code does not need to explicitly reference the matrix Z, since all this matrix does is select out the inactive/virtual pixels. Rather, the code may select out these pixels directly by referencing the appropriate indices of u. Also, note that the only non-zero entries in q will be entries corresponding to virtual pixels. As a result, one only needs to allocate memory to hold the entries of q at these locations.

3. Step Size Restrictions

In order to guarantee stability (i.e., convergence) of the method, the step size parameters may be chosen appropriately. In the case where we have no virtual pixels, the step size restriction is $$\tau\sigma<\tfrac{1}{8}.$$

In the case of virtual pixels, we now have the restriction $$8\sigma_p+\sigma_q<1.$$

4. Adaptation for Integer Arithmetic

In order to make TV-PDHG compatible with integer arithmetic, we need to make some changes to the algorithm.

4.1. Rescaling Data. In order to use fixed point arithmetic, we need to make sure that the input data is scaled properly so that our intermediate calculations don't overflow. To determine the scale of the image to be reconstructed, we compute the approximate reconstructed image $$u_{approx}=D^TH^TRs.$$

This transformation achieves a mapping back into the original coordinate domain of the signal x (e.g., the pixel domain in the case where x is an image). We then measure $$M=\max(|u_{approx}|).$$

The value M gives us an upper bound on the size of the pixels.

For integer arithmetic to be used, the data needs to be rescaled to that $M=2^b$, where b is the number of bits that we want the solution to use. This can be accomplished simply by multiplying the entries of s by an appropriate constant. This rescaling may happen before any other calculations occur.

4.2. Rescaling of the TV Term. If we apply TV-PDHG to the original problem, then the entries of p range from −1 to 1. This is a problem because the entries of u may be substantially smaller or larger than 1. To use fixed point arithmetic, all of the quantities we store must exist on roughly the same scale, otherwise we will have underflow or overflow errors.

We can fix the situation by solving the problem $$\min_u \{M|\nabla u| + \frac{\mu}{2}\|RHDu - s\|^2\} \quad (5)$$

instead of (1). The only change we have made is that we now scale up the strength of the TV term by a factor of M. This problem can be re-written as $$\max_{|p| \leq M} \min_u \{(p \cdot \nabla u) + \frac{\mu}{2}\|RHDu - s\|^2\} \quad (6)$$

as opposed to (2). When we apply TV-PDHG to this problem, we only have to change the proximal step for p, which now becomes $$p_{k+1} = \min\{\max(\hat{p}, -M), M\},$$

similar to the expression for $p_{k+1}$ given at the end of section 1.4.

As a result, the entries of p now have maximal value M, just like the pixels in the image.

This rescaling of the TV term has another added benefit: it makes the choice of µ independent of the size of the recovered image. In other words, because both the TV and quadratic terms in the objective energy now scale proportional to the size of the recovered image, we can simply choose a constant value of µ. Had we not introduced the new TV scaling, we would have to change the value of µ to adapt to the size of the image.

4.3. Computation of the Proximal Step u. The proximal update for u is $$u_{k+1} = D^T H^T (\mu R + \tau^{-1} I)^{-1} HD\left(\mu D^T H^T Rs + \frac{1}{\tau}\hat{u}\right).$$

Unfortunately, this step is bad for fixed point arithmetic. The reason is that we must multiply by the diagonal matrix $(\mu R + I/\tau)^{-1}$. In general, we want to choose large values for µ and small values for τ, making the entries in this matrix very large.

We need to re-arrange things so than we don't have to multiply by any large or small numbers. To do this, we begin with the observation that, because R consists of only 1's and 0's:

$$(\mu R + \tau^{-1} I)^{-1} = \tau I - R\left(\tau - \frac{1}{\mu + \tau^{-1}}\right)$$

We can now write $$u_{k+1} = D^T H^T (\mu R + \tau^{-1} I)^{-1} HD\left(\mu D^T H^T Rs + \frac{1}{\tau}\hat{u}\right)$$

$$= D^T H^T \left(\tau I - R\left(\tau - \frac{1}{\mu + \tau^{-1}}\right)\right) HD\left(\mu D^T H^T Rs + \frac{1}{\tau}\hat{u}\right)$$

$$= D^T H^T \left(I - R\left(1 - \frac{1}{\mu\tau + 1}\right)\right) HD(\mu\tau D^T H^T Rs + \hat{u})$$

$$= D^T H^T \left(\mu\tau I - R\left(\mu\tau - \frac{\mu\tau}{\mu\tau + 1}\right)\right) HD(D^T H^T Rs + \mu^{-1}\tau^{-1}\hat{u})$$

$$= \left(\mu\tau I - \frac{(\mu\tau)^2}{\mu\tau + 1} D^T H^T RHD\right)(D^T H^T Rs + \mu^{-1}\tau^{-1}\hat{u}).$$

4.4. Smart Choice of Parameters. Fixed point multiplication and division generally require some extra storage space during calculation, and so we would like to minimize this by multiplying and dividing by 'nice' small numbers. We want to avoid multiplication and division by large numbers, which might cause under/overflow errors unless we use extra digits of precision. This requires us to choose our parameters in a smart way.

For the integer code with virtual pixels, we must satisfy the timestep restriction ($8\sigma_p + \sigma_q < 1$), while still achieving fast convergence and simultaneously trying to get the coefficients in the proximal update for u to look nice.

In one embodiment, the following set of choices is used: µ=120, $\sigma_p$=3, $\sigma_q$=7 and τ=1/32. It is easy to verify that this set of choices satisfies the stability condition. Also, the updates for u involve nice integer multiplication and division by small numbers. We must divide by the quantity µτ+1=4, as well as µτ=3. It should be understood that a wide variety of other sets of choices are contemplated. Choices resulting in τ being a power of two and/or choices resulting in µτ+1 being a power of two may be advantageous.

In some software embodiments, multiplication and division by constants may be hard coded—i.e., making no direct reference to variables µ, $\sigma_p$, $\sigma_q$ and τ.

4.5. Normalization of the Hadamard Transform. The conventional Hadamard transform works by applying sums and differences to the N elements of a data vector at the first 'level' of the transform. The data is then divided into two parts, and the transform is recursively applied on each level. Finally, after the transform is complete, the data is divided by $\sqrt{N}$.

The algorithm as described above does not work in fixed point. This is because it requires that we divide by a very large number, $\sqrt{N}$. In integer arithmetic, we avoid this caveat by dividing by a factor of 2 after every even-indexed level is completed (i.e., the first level has no renormalization, after the second level we divide by 2, the third level has no renormalization, after the fourth level we divide by 2, and so forth).

It is actually possible to use a non-normalized transform, H, as long as the combined action of H and $H^{-1}$ is unitary. For example, H is allowed to scale the data up as long as $H^{-1}$ scales it back down appropriately. This happens when the number of levels of the transform is odd. In this case, the forward transform scales the data up by a factor of $\sqrt{2}$. If the same normalization scheme is used on the inverse transform (i.e., divide by 2 every other level), then the inverse transform also expands the data by $\sqrt{2}$. To compensate, at the end of the $H^{-1}$ transform, we must divide by an extra factor of 2 to maintain normality.

In the case of the radix-12 Hadamard transform, the final transform level consists of size 12 blocks. Because we cannot easily divide by $\sqrt{12}$ in fixed-point arithmetic, we instead divide by 2 after the forward transform, and 6 on the inverse. Alternately, if the data expands too much after the forward transform, one can divide by 4 after the forward transform, and 3 after the inverse. All that matters is that the combined effect is the removal of a factor of 12.

Figure 2:
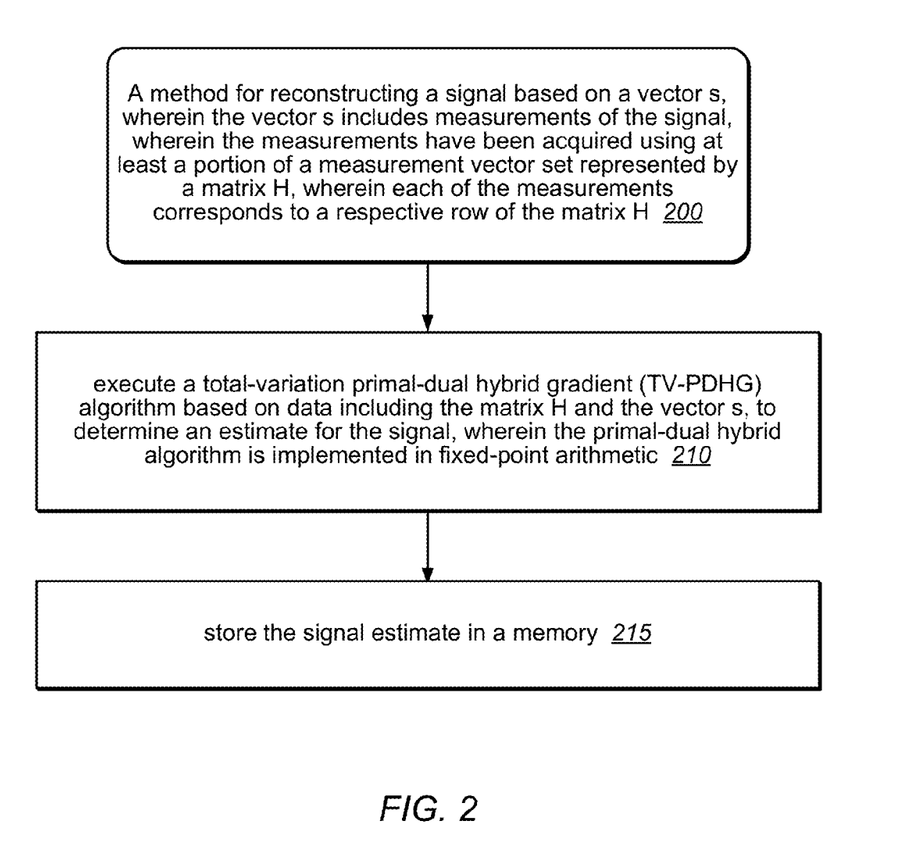
FIG. 2 illustrates one embodiment of a method for reconstructing a signal that has been acquired by a inner-product-based sensing device.

In one set of embodiments, a method 200 for reconstructing a signal may involve the operations shown in FIG. 2. (The method 200 may also include any subset of the features, elements and embodiments described above.) The method 200 may operate based on on a vector s, wherein the vector s includes measurements of the signal. The measurements have been acquired using at least a portion of a measurement vector set represented by a matrix H. (In some embodiments, the measurement vector set is a basis set.) Each of the measurements corresponds to a respective row of the matrix H.

At 210, a total-variation primal-dual hybrid gradient (TV-PDHG) algorithm may be executed based on data including the matrix H and the vector s, to determine an estimate for the signal. The action of executing the TV-PDHG algorithm may be performed by digital circuitry. The total-variation primal-dual hybrid algorithm may be implemented in fixed-point arithmetic (or integer arithmetic).

At 215, the signal estimate is stored in a memory, e.g., a memory as variously described above.

In some embodiments, each of the measurements corresponds to an inner product between the signal and a respective row of the matrix product HD, wherein D is a generalized permutation matrix. A generalized permutation matrix is a matrix with exactly one non-zero element in each column and each row, where the non-zero element is taken from the set of non-zero real numbers. (For more information, please consult http://en.wikipedia.org/wiki/Generalized_permutation_matrix.)

The data used by the TV-PDHG algorithm may include the generalized permutation matrix D. For example, the action of executing the TV-PDHG algorithm may determine the estimate for the signal by determining a vector $u_{min}$ that at least approximates the minimum of the expression $$|\text{grad}\, u| + (\mu/2)\|RHDu - s\|^2$$

over a space of signals corresponding to the vector variable u. R may be a diagonal matrix whose diagonal elements are selected from the set $\{0,1\}$, but R is not equal to the zero matrix. In other words, not all the diagonal elements of R equal zero. The value $\mu$ is a non-negative scalar value. In some embodiments, $\mu$ is a positive value. The scalar $\mu$ may controls the relative importance of minimizing the term $|\text{grad}\, u|$ versus the term $\|RHDu-s\|^2$.

In some embodiments, the action of executing the TV-PDHG algorithm may determine the estimate for the signal by determining a vector $u_{min}$ that at least approximates the solution to the problem given by:

$$\max_{|p| \leq M'} \min_u \left\{ p \cdot \nabla u + \frac{\mu}{2} \|RHDu - s\|^2 \right\},$$

where the minimization is over a space of signals corresponding to the vector variable u, where p is a vector variable, where M' is a positive constant, where R is a diagonal matrix whose diagonal elements are selected from the set $\{0,1\}$. As noted above, R is not equal to the zero matrix, and t is a non-negative (or positive) scalar value.

In some embodiments, the matrix D is a permutation matrix or a signed permuation matrix. A signed permutation matrix is a matrix with exactly one non-zero element in each column and each row, where the non-zero element is taken from the set $\{1,-1\}$.

In some embodiments, the matrix D is a diagonal matrix whose diagonal elements are selected from the set $\{1,-1\}$, where the diagonal elements include both ones and minus ones.

In some embodiments, the positive constant M' is greater than or equal to the maximum M of the absolute value of the components of the vector $D^T H^T Rs$.

In some embodiments, M' is the smallest power of two that is greater than or equal to M.

As noted above, D may be a diagonal matrix whose diagonal elements are selected from the set $\{-1,1\}$, where the diagonal elements of the matrix D include both 1s and −1s. In this case, the multiplication of the matrix H by the matrix D may be implemented as follows. For each −1 value on the diagonal of matrix D, negate the corresponding column of the matrix H. "Negating a column" means flipping the sign of each element in the column.

In some embodiments, the number of measurements included in the vector s is less than or equal to the number of components in the vector u.

In some embodiments, the number of measurements included in the vector s is less than or equal to the number of rows in the matrix H.

In some embodiments, the above-described problem is solved subject to the constraint that a specified subset of the components in vector u are equal to zero.

In some embodiments, M' is the power of two that is closest to the maximum M of the absolute value of the components of the vector $D^T H^T Rs$.

In some embodiments, the TV-PDHG algorithm includes a plurality of computational iterations, wherein each of the computational iterations includes: (a) a gradient descent step on the expression $p_k \cdot \nabla u$ with respect vector u, to determine a vector $\hat{u}$, wherein $p_k$ is a current estimate of the vector p, wherein the gradient descent step uses a stepsize $\tau$; and (b) a proximal step to determine a vector $u_{k+1}$ that solves the minimization given by $$\min_u \left\{ \frac{\mu}{2} \|RHDu - s\|^2 + \frac{1}{2\tau} \|u - \hat{u}\|^2 \right\}.$$

Each of the computational iterations may also include: (c) an over-relaxation step to determine an improved vector $\bar{u}$ based on the vector $u_{k+1}$ and a previous proximal-step vector $u_k$; (d) a gradient ascent step on the expression $p \cdot \nabla \bar{u}$ relative to the vector p in order to determine a vector $\hat{p}$, wherein the gradient ascent step uses a stepsize $\sigma$; and (e) a proximal step to project the vector $\hat{p}$ onto the constraint set given by $|p| \leq M'$ in order to obtain a vector $p_{k+1}$.

In some embodiments, the signal is an image, wherein the vector s is acquired by an imaging device including a light modulation unit and a light sensing device. The light modulation unit may be configured to modulate an incident light stream with a temporal sequence of spatial patterns in order to obtain a modulated light stream. The light sensing device may be configured to capture a temporal sequence of samples of intensity of the modulated light stream. Each of the spatial patterns may correspond to a respective row of the matrix H, where the vector s includes the intensity samples (or values derived from the intensity sample, e.g., by averaging). The imaging device may be configured as variously described in U.S. patent application Ser. No.

13/197,304, filed Aug. 3, 2011, invented by Woods, Baraniuk, Kelly, McMackin, Chatterjee and Bridge, which is hereby incorporated by reference in its entirety as though fully and completely set forth herein.

In some embodiments, the number of intensity samples is less than the number of pixels in the estimated image.

In some embodiments, the vector s is acquired by a measurement generation device that is configured to acquire or compute inner products of the signal with respective rows of the matrix H or a matrix derived from the matrix H. (For example, the measurement generation device may be is configured to acquire or compute inner products of the signal with respective rows of the matrix product HD.) The vector s may include the inner products.

In various embodiments, the signal may be an image or a communication signal or a radar signal or an acoustic signal or a sonar signal or a seismic signal or a video signal or any combination of the foregoing.

In some embodiments, the method 200 may include one or more of the following: (1) displaying a graphical representation of the signal estimate using a display device; (2) outputting an acoustic representation of the signal estimate using a speaker; (3) demodulating or decoding the signal estimate to recover information from the signal estimate.

In various embodiments, the digital circuitry may include one or more of the following: (a) one or more field-programmable gate arrays (FPGAs); (b) one or more processors configured to execute stored program instructions; (c) one or more application-specific integrated circuits (ASICs).

In some embodiments, the components of the matrix H are ones and minus ones.

In some embodiments, the matrix H is a Hadamard matrix.

In some embodiments, the matrix H is a matrix populated with randomly-generated values.

In some embodiments, the method 200 may also include subtracting the mean value of the measurements from the vector s prior to said executing the TV-PDHG algorithm.

In some embodiments, the matrix H is a Hadamard matrix, wherein the size of the matrix H includes a power of two in its factorization, wherein said executing the TV-PDHG algorithm includes performing a number of computational iterations, wherein each of the iterations includes performing a Hadamard transform corresponding to the matrix H, wherein the Hadamard transform includes a plurality of levels of recursion, wherein said performing the Hadamard transform includes performing a normalizing division only after even-numbered levels among the plurality of levels, wherein the normalizing division is a division by two. (The division by two may be efficiently implemented in hardware or software using a right shift.)

In some embodiments, the action of executing the TV-PDHG algorithm may include performing a number of computational iterations, where each of the iterations includes a set of operations, where the set of operations includes: (a) performing a non-normalized Hadamard transform; (b) performing a first normalizing division on an output of the non-normalized Hadamard transform, wherein the first normalizing division is a division by a first positive integer; (c) performing a non-normalized inverse Hadamard transform; and (d) performing a second normalizing division on an output of the non-normalized inverse Hadamard transform, wherein the second normalizing division is a division by a second positive integer, wherein at least one of the first positive integer and the second positive integer is not a pure power of two. (A pure power of two is an integer of the form $2^k$, where k is positive.)

In some embodiments, the action of executing the TV-PDHG algorithm may include performing a number of computational iterations, where each of the iterations includes a set of operations, where the set of operations includes: (a) performing a non-normalized Hadamard transform; (b) performing a non-normalized inverse Hadamard transform; and (c) performing a normalizing division on the input of the non-normalized Hadamard transform or the output of the non-normalized inverse Hadamard transform, wherein the normalizing division is a division by a positive integer.

In some embodiments, a non-transitory computer-readable memory medium may store program instructions for reconstructing a signal based on a vector s, where the vector s includes measurements of the signal, wherein the measurements have been acquired using at least a portion of a measurement vector set represented by a matrix H, where each of the measurements corresponds to a respective row of the matrix H. The program instructions, when executed by a processor (or a set of one or more processors), cause the processor (or the set of one or more processors) to implement: executing a total-variation primal-dual hybrid gradient (TV-PDHG) algorithm based on data including the matrix H and the vector s, to determine an estimate for the signal, wherein said executing is performed by digital circuitry, wherein the total-variation primal-dual hybrid algorithm is implemented in fixed-point arithmetic; and storing the signal estimate in a memory.

In some embodiments, Hadamard transforms and/or inverse Hadmard transforms may be performed as variously described in U.S. Provisional Application 61/762,600, filed Feb. 8, 2013, entitled "Efficient Generation of Signal Sensing-Matrix Vectors and Efficient Transform for Signal Reconstruction", invented by Herman, Weston, Stellenberg and Vargas, which is hereby incorporated by reference in its entirety as though fully and completely set forth herein.

Figure 3:
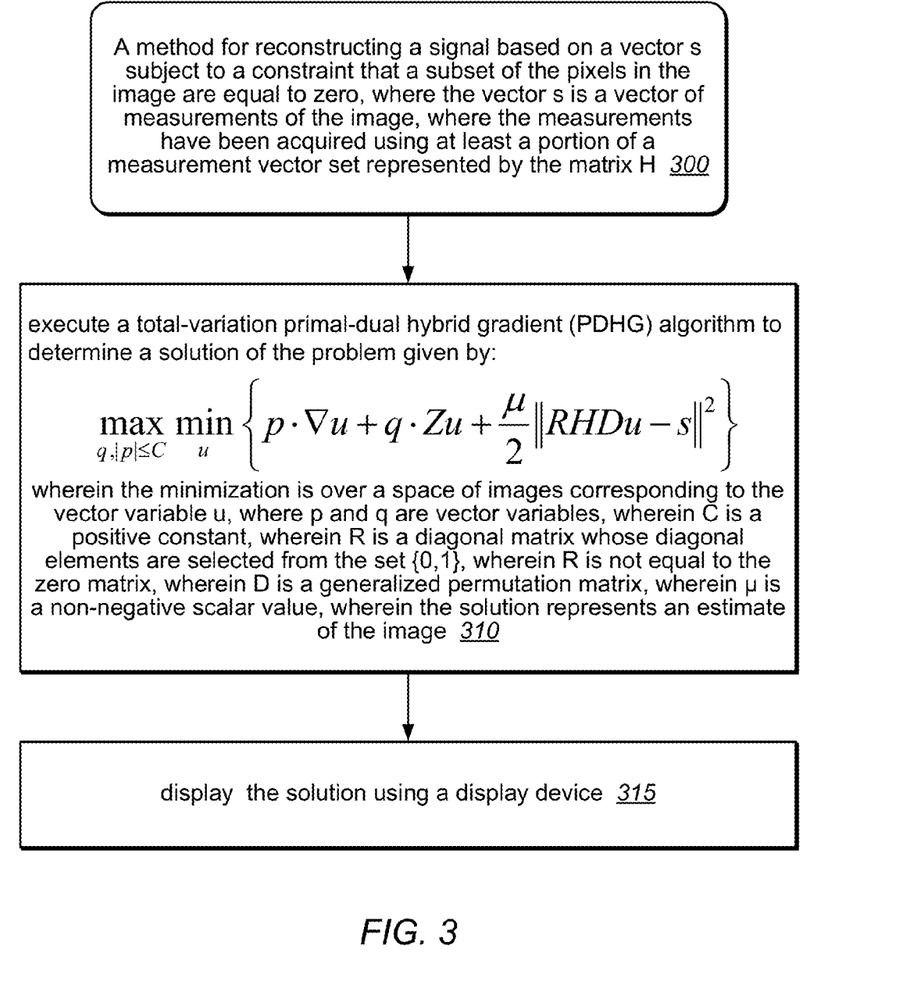
FIG. 3 illustrates another embodiment of a method for reconstructing a signal that has been acquired by a inner-product-based sensing device.

In one set of embodiments, a method 300 for reconstructing a signal based on a vector s subject to a constraint that a subset of the pixels in the image are equal to zero, wherein the vector s is a vector of measurements of the image, wherein the measurements have been acquired using at least a portion of a measurement vector set represented by the matrix H, the method comprising.

At 310, a total-variation primal-dual hybrid gradient (TV-PDHG) algorithm may be executed to determine a solution of the problem given by:

$$\max_{q, |p| \leq C} \min_u \{ p \cdot \nabla u + q \cdot Zu + \frac{\mu}{2} \|RHDu - s\|^2 \},$$

wherein the minimization is over a space of images corresponding to the vector variable u, where p and q are vector variables, wherein said executing is performed by digital circuitry, wherein C is a positive constant, wherein R is a diagonal matrix whose diagonal elements are selected from the set $\{0,1\}$, wherein R is not equal to the zero matrix, wherein D is a generalized permutation matrix, wherein t is a non-negative scalar value, wherein the solution represents an estimate of the image; and At 315, the solution may be displayed using a display device.

In some embodiments, C is an integer greater than or equal to the maximum M of the absolute value of the components of the vector $D^T H^T Rs$.

In some embodiments, C equals one.

In some embodiments, the TV-PDHG algorithm includes a plurality of computational iterations, wherein each of the computational iterations includes: (a) a gradient descent step on the expression $p_k \cdot \nabla u + q_k Zu$ with respect vector u to determine a vector $\hat{u}$, wherein $p_k$ is a current estimate of the vector p, wherein $q_k$ is a current estimate of the vector q, wherein the gradient descent step uses a stepsize $\tau$; (b) a proximal step to determine a vector $u_{k+1}$ that solves the minimization given by $$\min_u \left\{ \frac{\mu}{2} \|RHDu - s\|^2 + \frac{1}{2\tau} \|u - \hat{u}\|^2 \right\};$$

(c) an over-relaxation step to determine an improved vector $\overline{u}$ based on the vector $u_{k+1}$ and a previous proximal-step vector $u_k$; (d) a gradient ascent step on the expression $p \cdot \nabla \overline{u}$ relative to the vector p using a stepsize $\sigma_p$ in order to determine a vector $\hat{p}$;

a proximal step to project the vector $\hat{p}$ onto the constraint set given by $|p| \leq C$ in order to obtain a vector $p_{k+1}$; and (e) a gradient ascent step on the expression $q \cdot Z\overline{u}$ relative to the vector q using a stepsize $\sigma_q$.

In some embodiments, the number of measurements included in the vector s is less than or equal to the number of rows in the matrix H.

In some embodiments, the digital circuitry includes one or more of the following: (a) one or more processors operating under the control of program instructions; (b) one or more FPGAs; (c) one or more ASICs.

In some embodiments, the multiplication of the vector u by matrix Z is implemented by directly addressing the non-zero components of vector u.

In some embodiments, the signal may be an image, and the vector s may be acquired by an imaging device including a light modulation unit and a light sensing device. The light modulation unit may be configured to modulate an incident light stream with a temporal sequence of spatial patterns in order to obtain a modulated light stream. (The image may be carried in the incident light stream.) The light sensing device may be configured to capture a temporal sequence of intensity samples of the modulated light stream, where each of the spatial patterns corresponds to a respective row of the matrix H. The vector s includes the intensity samples.

In some embodiments, the vector s may be acquired by a measurement generation device that is configured to acquire or compute inner products of the signal with respective rows of the matrix H or a matrix derived from the matrix H. The vector s includes the inner products.

For more information of the subject of primal-dual algorithms, please see the following references:

[1] Antonin Chambolle and Thomas Pock. A first-order primal-dual algorithm for convex problems with applications to imaging. Convergence, 40(1):1-49, 2010.

[2] Ernie Esser, Xiaoqun Zhang, and Tony Chan. A general framework for a class of first order primal-dual algorithms for tv minimization. UCLA CAM Report 09-67, 2009.

[3] "Convergence analysis of primal-dual algorithms for total variation image restoration" by Bingsheng He and Xiaoming Yuan, November 2010.

Any of the various embodiments described herein may be combined to form composite embodiments. Furthermore, any of the various features, embodiments and elements described in U.S. Provisional Application No. 61/745,017 may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for reconstructing a signal based on a vector s, wherein the vector s includes measurements of the signal, wherein the measurements have been acquired using at least a portion of a measurement vector set represented by a matrix H, wherein each of the measurements corresponds to a respective row of the matrix H, the method comprising:

executing a total-variation primal-dual hybrid gradient (TV-PDHG) algorithm based on data including the matrix H and the vector s, to determine an estimate for the signal, wherein said executing is performed by digital circuitry, wherein the total-variation primal-dual hybrid algorithm is implemented in fixed-point arithmetic; and storing the signal estimate in a memory, wherein said data also includes a matrix D, where D is a generalized permutation matrix, wherein said executing the TV-PDHG algorithm determines the estimate for the signal by determining a vector $u_{min}$ that at least approximates the solution to the problem given by:

$$\max_{|p| \leq M'} \min_u \left\{ p \cdot \nabla u + \frac{\mu}{2} \|RHDu - s\|^2 \right\},$$

wherein the minimization is over a space of signals corresponding to a vector variable u, wherein p is a vector variable, wherein M' is a positive constant, wherein R is a diagonal matrix whose diagonal elements are selected from the set $\{0,1\}$, wherein R is not equal to the zero matrix, wherein $\mu$ is a non-negative scalar value, wherein the signal is an image, wherein the vector s is acquired by an imaging device including a light modulation unit and a light sensing device, wherein the light modulation unit is configured to modulate an incident light stream with a temporal sequence of spatial patterns in order to obtain a modulated light stream, wherein the light sensing device is configured to capture a temporal sequence of samples of intensity of the modulated light stream, wherein each of the spatial patterns corresponds to a respective row of the matrix H, wherein the vector s includes the intensity samples.

2. The method of claim 1, wherein each of the measurements corresponds to an inner product between the signal and a respective row of the matrix product HD, wherein D is a generalized permutation matrix.

3. The method of claim 1, wherein said data also includes a matrix D, where D is a generalized permutation matrix, wherein said executing the TV-PDHG algorithm determines the estimate for the signal by determining a vector $u_{min}$ that at least approximates the minimum of the expression $$|\text{grad } u| + (\mu/2) \|RHDu - s\|^2$$

over a space of signals corresponding to the vector variable u, wherein R is a diagonal matrix whose diagonal elements are selected from the set {0,1}, wherein R is not equal to the zero matrix, wherein μ is a non-negative scalar value.

4. The method of claim 3, wherein the scalar μ controls the relative importance of minimizing the term |grad u| versus the term $\|RHDu-s\|^2$.

5. The method of claim 1, wherein D is one of:
   a permutation matrix;
   a signed permutation matrix; or
   a diagonal matrix whose diagonal elements are selected from the set {1,−1}, wherein the diagonal elements of the matrix D include both 1s and −1s.

6. The method of claim 1, wherein M' is greater than or equal to the maximum M of the absolute value of the components of the vector $D^T H^T Rs$.

7. The method of claim 6, wherein M' is the smallest power of two that is greater than or equal to M.

8. The method of claim 1, wherein D is a diagonal matrix whose diagonal elements are selected from the set {−1,1}, wherein the diagonal elements of the matrix D include both 1s and −1s, wherein multiplication of the matrix H by the matrix D is implemented by: for each −1 value on the diagonal of matrix D, negating the corresponding column of the matrix H.

9. The method of claim 1, wherein the number of measurements included in the vector s is less than or equal to the number of components in the vector u.

10. The method of claim 1, wherein the number of measurements included in the vector s is less than or equal to the number of rows in the matrix H.

11. The method of claim 1, wherein said problem is solved subject to the constraint that a specified subset of the components in vector u are equal to zero.

12. The method of claim 1, wherein M' is the power of two that is closest to the maximum M of the absolute value of the components of the vector $D^T H^T Rs$.

13. The method of claim 1, wherein the TV-PDHG algorithm includes a plurality of computational iterations, wherein each of the computational iterations includes:
   a gradient descent step on the expression $p_k \cdot \nabla u$ with respect vector u, to determine a vector û, wherein $p_k$ is a current estimate of the vector p, wherein the gradient descent step uses a stepsize τ;
   a proximal step to determine a vector $u_{k+1}$ that solves the minimization given by $$\min_u \left\{ \frac{\mu}{2} \|RHDu - s\|^2 + \frac{1}{2\tau} \|u - \hat{u}\|^2 \right\}.$$

14. The method of claim 13, wherein each of the computational iterations also includes:
   an over-relaxation step to determine an improved vector ū based on the vector $u_{k+1}$ and a previous proximal-step vector $u_k$;
   a gradient ascent step on the expression $p \cdot \nabla \bar{u}$ relative to the vector p in order to determine a vector p̂, wherein the gradient ascent step uses a stepsize σ;
   a proximal step to project the vector p̂ onto the constraint set given by |p|≤M' in order to obtain a vector $p_{k+1}$.

15. The method of claim 1, wherein a number of the intensity samples is less than a number of pixels in the estimated image.

16. The method of claim 1, wherein the vector s is acquired by a measurement generation device that is configured to acquire or compute inner products of the signal with respective rows of the matrix H or a matrix derived from the matrix H, wherein the vector s includes the inner products.

17. The method of claim 1, wherein the signal is an image or a communication signal or a radar signal or an acoustic signal or a sonar signal or a seismic signal or a video signal.

18. The method of claim 1, further comprising one or more of the following:
   displaying a graphical representation of the signal estimate using a display device;
   outputting an acoustic representation of the signal estimate using a speaker;
   demodulating or decoding the signal estimate to recover information from the signal estimate.

19. The method of claim 1, wherein said digital circuitry includes one or more of the following:
   (a) one or more field-programmable gate arrays (FPGAs);
   (b) one or more processors configured to execute stored program instructions;
   (c) one or more application-specific integrated circuits (ASICs).

20. The method of claim 1, wherein the matrix H is a Hadamard matrix, or matrix whose components are ones and minus ones, or a matrix populated with randomly-generated values.

21. The method of claim 1, further comprising:
   subtracting the mean value of the measurements from the vector s prior to said executing the TV-PDHG algorithm.

22. The method of claim 1, wherein the matrix H is a Hadamard matrix, wherein the size of the matrix H includes a power of two in its factorization, wherein said executing the TV-PDHG algorithm includes performing a number of computational iterations, wherein each of the iterations includes performing a Hadamard transform corresponding to the matrix H, wherein the Hadamard transform includes a plurality of levels of recursion, wherein said performing the Hadamard transform includes performing a normalizing division only after even-numbered levels among the plurality of levels, wherein the normalizing division is a division by two.

23. The method of claim 1, wherein said executing the TV-PDHG algorithm includes performing a number of computational iterations, wherein each of the iterations includes a set of operations, wherein the set of operations includes:
   performing a non-normalized Hadamard transform;
   performing a first normalizing division on an output of the non-normalized Hadamard transform, wherein the first normalizing division is a division by a first positive integer;
   performing a non-normalized inverse Hadamard transform; and
   performing a second normalizing division on an output of the non-normalized inverse Hadamard transform, wherein the second normalizing division is a division by a second positive integer, wherein at least one of the first positive integer and the second positive integer is not a pure power of two.

24. The method of claim 1, wherein said executing the TV-PDHG algorithm includes performing a number of computational iterations, wherein each of the iterations includes a set of operations, wherein the set of operations includes:
   performing a non-normalized Hadamard transform;
   performing a non-normalized inverse Hadamard transform; and performing a normalizing division on the input of the non-normalized Hadamard transform or the output of the non-normalized inverse Hadamard transform, wherein the normalizing division is a division by a positive integer.

25. A non-transitory computer-readable memory medium for reconstructing a signal based on a vector s, wherein the vector s includes measurements of the signal, wherein the measurements have been acquired using at least a portion of a measurement vector set represented by a matrix H, wherein each of the measurements corresponds to a respective row of the matrix H, wherein the memory medium stores program instructions, wherein the program instructions, when executed by a processor, cause the processor to implement:

executing a total-variation primal-dual hybrid gradient (TV-PDHG) algorithm based on data including the matrix H and the vector s, to determine an estimate for the signal, wherein said executing is performed by digital circuitry, wherein the total-variation primal-dual hybrid algorithm is implemented in fixed-point arithmetic; and storing the signal estimate in a memory, wherein said data also includes a matrix D, where D is a generalized permutation matrix, wherein said executing the TV-PDHG algorithm determines the estimate for the signal by determining a vector $u_{min}$ that at least approximates the solution to the problem given by:

$$\max_{|p| \leq M'} \min_u \{ p \cdot \nabla u + \frac{\mu}{2} \|RHDu - s\|^2 \},$$

wherein the minimization is over a space of signals corresponding to a vector variable u, wherein p is a vector variable, wherein M' is a positive constant, wherein R is a diagonal matrix whose diagonal elements are selected from the set $\{0,1\}$, wherein R is not equal to the zero matrix, wherein $\mu$ is a non-negative scalar value, wherein the signal is an image, wherein the vector s is acquired by an imaging device including a light modulation unit and a light sensing device, wherein the light modulation unit is configured to modulate an incident light stream with a temporal sequence of spatial patterns in order to obtain a modulated light stream, wherein the light sensing device is configured to capture a temporal sequence of samples of intensity of the modulated light stream, wherein each of the spatial patterns corresponds to a respective row of the matrix H, wherein the vector s includes the intensity samples.

26. A method for reconstructing a signal based on a vector s subject to a constraint that a subset of the pixels in the image are equal to zero, wherein the vector s is a vector of measurements of the image, wherein the measurements have been acquired using at least a portion of a measurement vector set represented by the matrix H, the method comprising:

executing a total-variation primal-dual hybrid gradient (TV-PDHG) algorithm to determine a solution of the problem given by:

$$\max_{q, |p| \leq C} \min_u \{ p \cdot \nabla u + q \cdot Zu + \frac{\mu}{2} \|RHDu - s\|^2 \},$$

wherein the minimization is over a space of images corresponding to a vector variable u, where p and q are vector variables, wherein said executing is performed by digital circuitry, wherein C is a positive constant, wherein matrix Z is a diagonal matrix of 0's and 1's, wherein R is a diagonal matrix whose diagonal elements are selected from the set $\{0,1\}$, wherein R is not equal to the zero matrix, wherein D is a generalized permutation matrix, wherein $\mu$ is a non-negative scalar value, wherein the solution represents an estimate of the image; and displaying the solution using a display device, wherein the signal is an image, wherein the vector s is acquired by an imaging device including a light modulation unit and a light sensing device, wherein the light modulation unit is configured to modulate an incident light stream with a temporal sequence of spatial patterns in order to obtain a modulated light stream, wherein the image is carried by the incident light stream, wherein the light sensing device is configured to capture a temporal sequence of intensity samples of the modulated light stream, wherein each of the spatial patterns corresponds to a respective row of the matrix H, wherein the vector s includes the intensity samples.

27. The method of claim 26, wherein C is an integer greater than or equal to the maximum M of the absolute value of the components of the vector $D^T H^T Rs$.

28. The method of claim 26, wherein C equals one.

29. The method of claim 26, wherein the TV-PDHG algorithm includes a plurality of computational iterations, wherein each of the computational iterations includes:

a gradient descent step on the expression $p_k \cdot \nabla u + q_k Zu$ with respect vector u to determine a vector $\hat{u}$, wherein $p_k$ is a current estimate of the vector p, wherein $q_k$ is a current estimate of the vector q, wherein the gradient descent step uses a stepsize $\tau$;

a proximal step to determine a vector $u_{k+1}$ that solves the minimization given by $$\min_u \{ \frac{\mu}{2} \|RHDu - s\|^2 + \frac{1}{2\tau} \|u - \hat{u}\|^2 \};$$

an over-relaxation step to determine an improved vector $\bar{u}$ based on the vector $u_{k+1}$ and a previous proximal-step vector $u_k$;

a gradient ascent step on the expression $p \cdot \nabla \bar{u}$ relative to the vector p using a stepsize $\sigma_p$ in order to determine a vector $\hat{p}$;

a proximal step to project the vector $\hat{p}$ onto the constraint set given by $|p| \leq C$ in order to obtain a vector $p_{k+1}$;

a gradient ascent step on the expression $q \cdot Z\bar{u}$ relative to the vector q using a stepsize $\sigma_q$.

30. The method of claim 26, wherein the number of measurements included in the vector s is less than or equal to the number of rows in the matrix H.

31. The method of claim 26, wherein said digital circuitry includes one or more of the following:

(a) one or more processors operating under the control of program instructions;
(b) one or more FPGAs;
(c) one or more ASICs.

32. The method of claim 26, wherein multiplication of the vector u by the matrix Z is implemented by directly addressing the non-zero components of vector u.

33. The method of claim 26, wherein the vector s is acquired by a measurement generation device that is configured to acquire or compute inner products of the signal with respective rows of the matrix H or a matrix derived from the matrix H, wherein the vector s includes the inner products.

\* \* \* \* \*